United States Patent
Stephens

(10) Patent No.: US 7,441,094 B2
(45) Date of Patent: Oct. 21, 2008

(54) MEMORY MANAGEMENT CONFIGURATION

(75) Inventor: Maoni Z. Stephens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 11/174,873

(22) Filed: Jul. 5, 2005

(65) Prior Publication Data

US 2007/0011658 A1 Jan. 11, 2007

(51) Int. Cl.
  *G06F 12/00* (2006.01)
  *G06F 13/00* (2006.01)
  *G06F 13/28* (2006.01)
  *G06F 17/30* (2006.01)
  *G06F 9/44* (2006.01)
  *G06F 3/00* (2006.01)

(52) U.S. Cl. .......... 711/170; 711/154; 711/165; 711/168; 707/206; 717/127; 715/700

(58) Field of Classification Search .......... 711/170
See application file for complete search history.

(56) References Cited

U.S. PATENT DOCUMENTS

| | | | | |
|---|---|---|---|---|
| 6,629,113 | B1 * | 9/2003 | Lawrence | 707/206 |
| 6,892,212 | B2 * | 5/2005 | Shuf et al. | 707/206 |
| 7,174,354 | B2 * | 2/2007 | Andreasson | 707/206 |
| 2002/0199115 | A1 * | 12/2002 | Peterson et al. | 713/201 |
| 2004/0039758 | A1 * | 2/2004 | Li | 707/206 |

\* cited by examiner

*Primary Examiner*—Kevin Ellis
*Assistant Examiner*—Ryan Bertram

(57) ABSTRACT

Memory management within a runtime execution environment may be configured in accordance with data associated with executable code loaded therein.

14 Claims, 4 Drawing Sheets

MEMORY MANAGEMENT CONFIGURATION

DESCRIPTION OF THE DRAWINGS

Memory management configuration is presently described in accordance with the following figures.

DETAILED DESCRIPTION

Memory management configuration is described herein. More particularly, the description herein pertains to controlling certain behavior of at least portions of an application based on data pertaining to characteristics of the application. Further, the behavior of the application may be controlled without touching or affecting any executable portion of the application.

Figure 1:
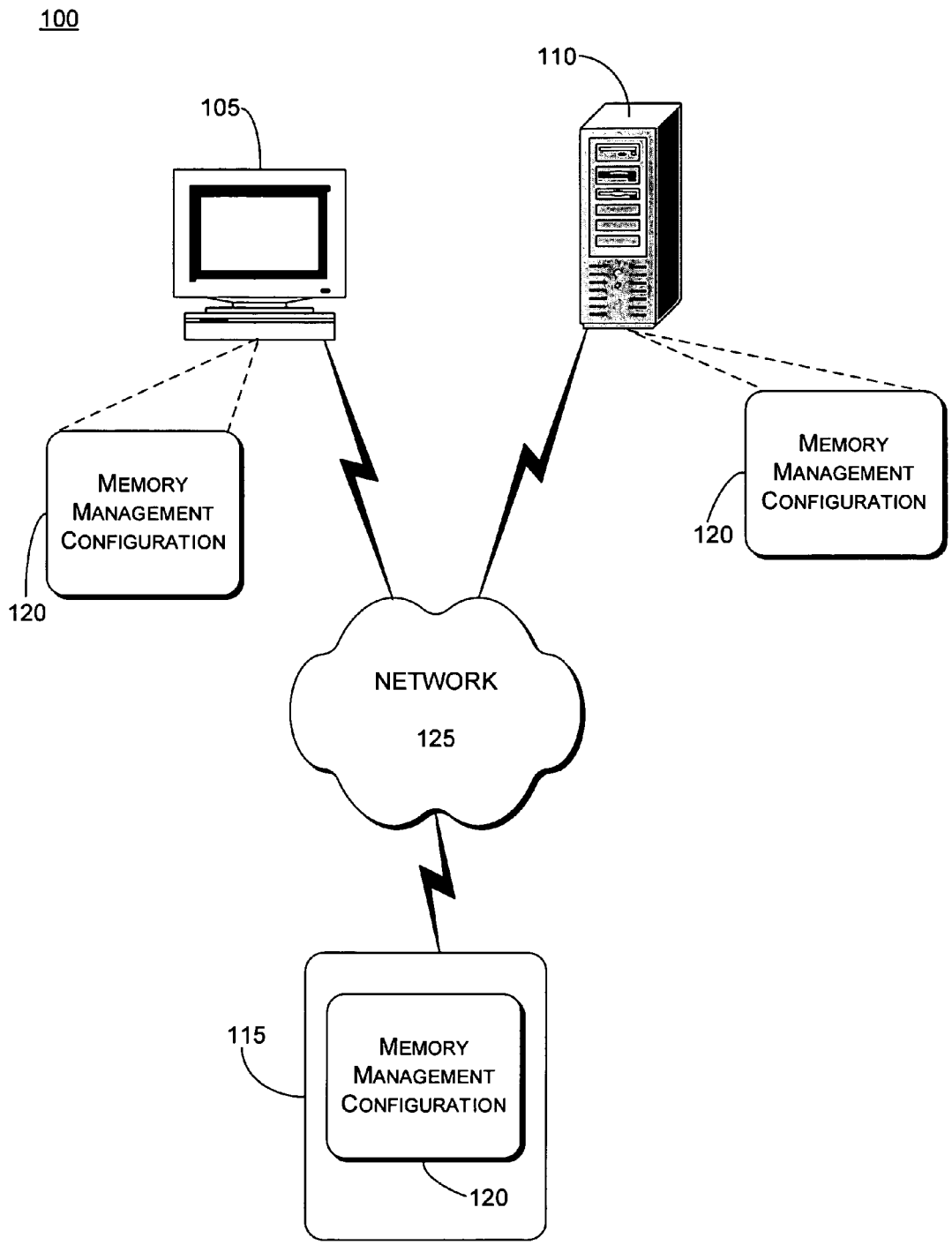
FIG. 1 shows devices communicating over a network, with the devices implementing example technologies for memory management configuration.

FIG. 1 shows example network environment 100 in which memory management configuration may be implemented. However, implementation of memory management configuration, according to at least one example, is not limited to network environments. Regardless, in FIG. 1, client device 105, server device 110, and "other" device 115 may be communicatively coupled to one another via network 125; and, further, at least one of client device 105, server device 110, and "other" device 115 may be capable of implementing memory management configuration 120, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115 in accordance with at least one implementation of memory management configuration 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 is any device that may be a content source, and client device 105 is any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing memory management configuration 120 according to one or more of the examples described herein. That is, "other" device 115 may be a software-enabled computing or processing device that is capable of implementing memory management configuration 120 for at least portions of an application, program, function, or other assemblage of programmable and executable code in at least a managed execution environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as 802.11 system; a personal area network (i.e., PAN), such as Bluetooth.

Computer architecture in at least one of devices 105, 110, and 115 has typically defined computing platforms in terms of hardware and software. Software for computing devices came to be categorized into groups, based on function, which include: a hardware abstraction layer (alternatively referred to as a "HAL"), an operating system (alternatively referred to as "OS"), and applications.

A runtime execution environment may refer to an isolated space, between the OS and an application, in which the application may execute specific tasks on at least one of processing device 105, 110, or 105. More particularly, the runtime execution environment is intended to enhance the reliability of the execution of applications on a growing range of processing devices including servers, desktop computers, laptop computers, mobile processing devices, set-top boxes, and gaming consoles by providing a layer of abstraction and services for an application running on such processing devices, and further providing the application with capabilities including memory management and configuration thereof.

A runtime execution environment may serve as at least one of an application programming and application execution platform.

As an application programming platform, a runtime execution environment may compile targeted applications, which may be written in one of multiple computing languages, into an intermediate language (hereafter "IL"). IL is typically independent of the platform and the central processing unit (hereafter "CPU") executes IL. In fact, IL is a higher level language than many CPU machine languages.

As an application execution platform, a runtime execution environment may interpret compiled IL into native machine instructions. A runtime execution environment may utilize either an interpreter or a "just-in-time" (hereafter "JIT") compiler to execute such instructions.

Regardless, the native machine instructions may then be directly executed by the CPU. Since IL is CPU-independent, IL may execute on a CPU platform as long as the OS running on that CPU platform hosts an appropriate runtime execution environment. Examples of runtime environments, to which memory management configuration 120 may pertain, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, such listing provides examples only. The example implementations are not limited to just these managed execution environments. Further, the example implementations are not just limited to managed execution environments, for one or more examples may be implemented within testing environments and/or unmanaged execution environments.

An application compiled into IL may be referred to as "managed code," and therefore a runtime execution environment may be alternatively referred to as a "managed execution environment." Portions of managed code may be referred to as a "managed image." Code that does not utilize a runtime execution environment to execute may be referred to as native code applications.

Figure 2:
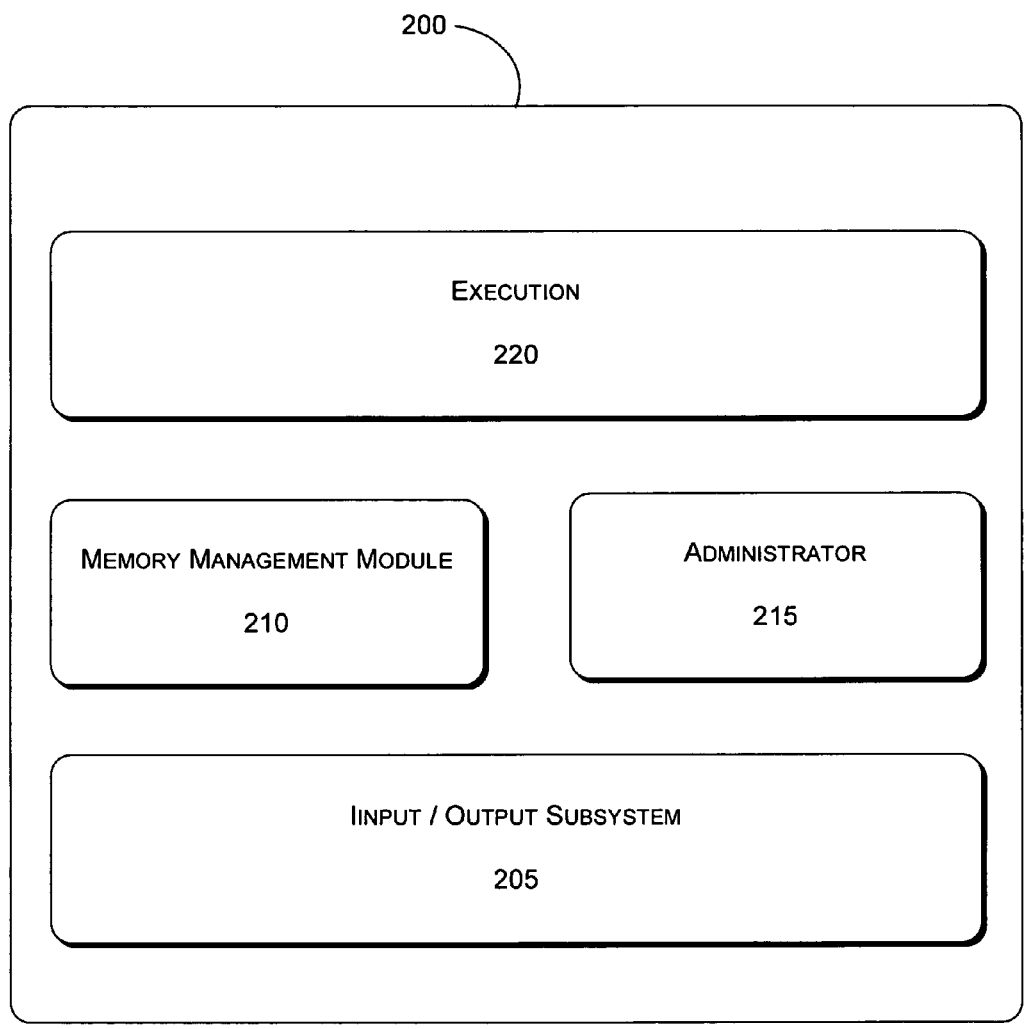
FIG. 2 shows an example of an execution environment for implementing example technologies for memory management configuration.

FIG. 2 shows an example of runtime execution environment 200 in which examples of memory management configuration 120 (see FIG. 1) may be implemented.

According to at least one example implementation, runtime execution environment 200 may facilitate execution of managed code for a computing device platform. Managed code may be considered to be part of a core set of application-development technologies, and may further be regarded as code that is compiled for execution on runtime execution environment 200 to provide a corresponding service to the computing device platform. In addition, runtime execution environment 200 may translate managed code at an interpretive level into instructions that may be proxied and then executed by a processor. A framework for runtime execution environment 200 may also provide class libraries, which may be regarded as software building blocks for managed applications.

According to a further example implementation, runtime execution environment 200 may provide at least partial functionality that may otherwise be expected from a kernel, which may or may not be lacking from a computing device platform depending upon resource constraints for the particular one of device 105, 110, and 115. Thus, at least one example of runtime execution environment 200 may implement the following: input/output (hereafter "I/O") routine management, memory management, administration, and service routine management. Thus, runtime execution environment 200 may include I/O component 205, at least one memory management module 210, administrator 215, and execution component 220. These components, which are to be described in further detail below, are provided as examples only; that is, the examples are not intended to be limiting to any particular implementation, and no such inference should be made. Further, the components may be implemented in examples of runtime execution environment 200 in various combinations and configurations thereof.

I/O component 205 of runtime execution environment 200 may provide asynchronous access to data sources (i.e., processor and peripherals) associated with the computing device platform. More particularly, I/O component 205 may provide runtime execution environment 200 with robust system throughput and further streamline performance of code from which an I/O request originates.

Memory management module 210 may be regarded as a "garbage collector." Garbage collection (alternatively referred to, hereafter, as "GC") may be regarded as a robust feature of managed code execution environments by which an object is freed (i.e., de-allocated) if an object is no longer used by any applications, upon a sweep or scan of a memory heap. In at least one example of memory management module 210, a sweep of free memory heap may be implemented as a linear search. Such implementation may be well-suited for an example of a computing device platform for which memory size is constrained and for which a delay in completion of a sweep may be perceived by a user of a corresponding device.

According to at least one example of memory management configuration 120, memory management module 210 may implement "concurrent GC" functionality. Concurrent GC functionality may allow managed threads to continue to run during a sweep or scan of a memory heap. That is, during de-allocation, concurrent GC may allow allocation to continue in parallel. Conversely, non-concurrent GC functionality may suspend one or more managed threads during a sweep or scan of a memory heap.

Concurrent GC functionality (alternatively referred to herein as "concurrent GC") may be suitable for an interactive or GUI (graphical user interface)-based application. On the other hand, because concurrent GC may not suspend a managed thread for the duration of a collection, concurrent GC may degrade performance of a service application and other non-interactive applications. Such applications may further benefit from not having concurrent GC implemented thereon.

Further functions implemented by memory management module 210 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Administrator 215 may refer to a module within runtime execution environment 220 that serves to receive at least a portion of an application, program, method, function, or other assemblage of programmable and executable code for execution within runtime execution environment 200. Further, in accordance with at least one example implementation of memory management configuration 120, administrator 215 may control the behavior of the application, program, method, function, or other assemblage of programmable and executable code within runtime execution environment 220 without touching or affecting any executable portion thereof, at compile time, initial runtime, or at any time thereafter during execution of an application.

Execution component 220 may enable execution of managed code for the computing device platform. Execution component 220 may be regarded as the environment in which execution of the code of the application is implemented, and in which runtime services (e.g., device access and memory management) may be provided.

Figure 3:
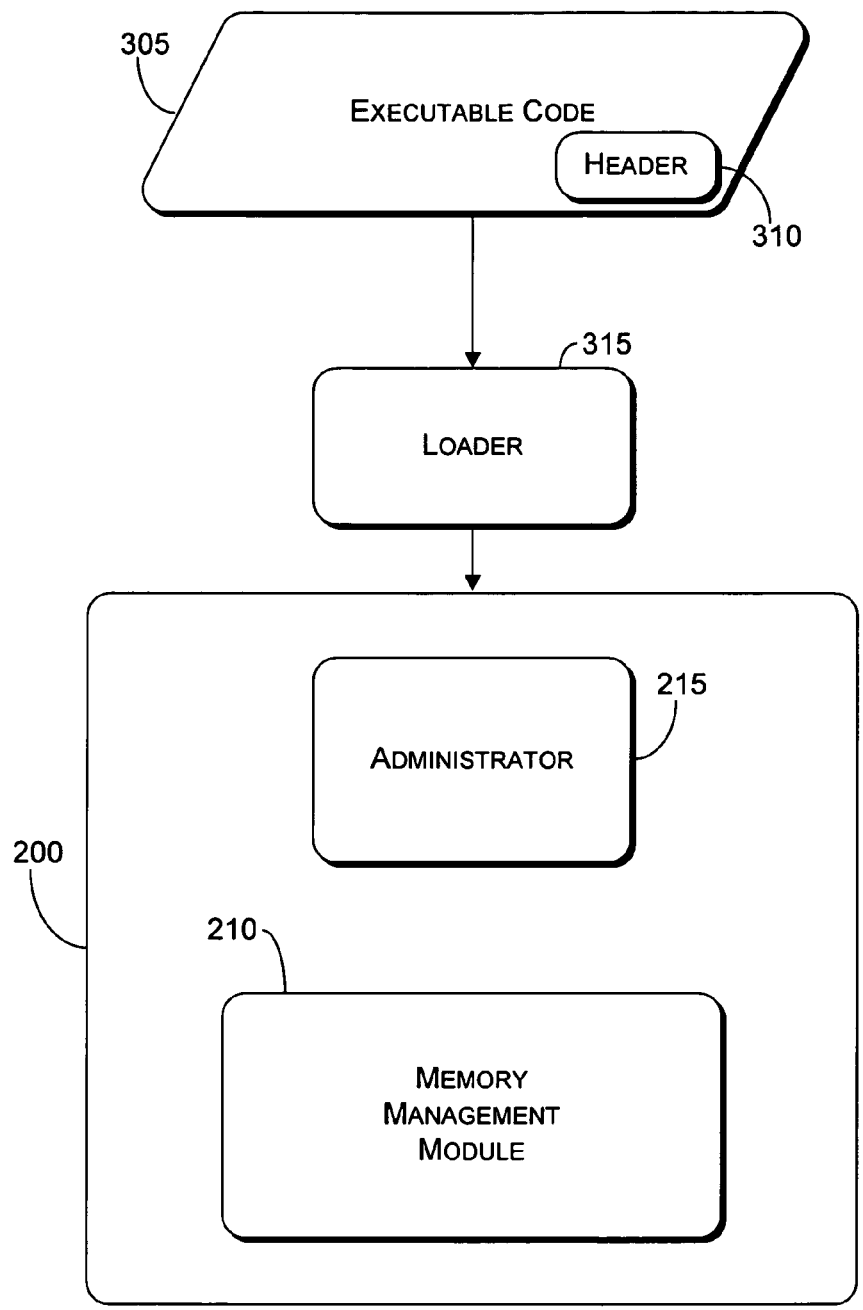
FIG. 3 shows an example data flow in accordance with an example implementation of memory management configuration.

FIG. 3 shows an example data flow in accordance with an example implementation of memory management configuration 120 (see FIG. 1).

Executable code 305 may refer to at least one application, program, method, function, or other assemblage of programmable and executable code that is intended for execution in runtime execution environment 200 on any of devices 105, 110, and 115. Thus, executable code 305 may be regarded as managed code or, as part of an application, program, method, function, or other assemblage of programmable and executable code in runtime execution environment 200, executable code 305 may alternatively be referred to as a managed image.

Header 310, associated with executable code 305, may contain at least one of source and destination addresses as well as type data that describe the content of executable code 305. In particular, header 310 may include data that indicates whether or not executable code 305 is associated with an interactive application. According to at least one example of memory management configuration 120, the data that indicates whether or not executable code 305 is associated with an interactive application may be a determining factor as to whether or not concurrent GC is implemented while executable code 305 is executed in runtime execution environment 200.

According to at least the presently described example of executable code 305, type data may be received into runtime execution environment 200 as part of header 310 associated with executable code 305. Alternatively, type data, though associated with executable code 305, may be received into runtime execution environment 200 separate from header 310. For example, type data may be received into runtime execution environment 200 on-line via network 125 (see FIG. 1) from a developer or administrator for executable code 305; or, type data may be received into runtime execution environment 200 in an off-line manner (e.g., via a transportable, computer-readable medium) from either of the aforementioned developer or administrator.

Loader 315 may refer to an assembly manager that may be invoked to locate and read assemblies as needed. Thus, loader 315 may garner executable code 305 and header 310 for loading into runtime execution environment 200. Alternatively, loader 315 may garner executable code 310 and the aforementioned type data separately. Regardless, loader 315 may effectively serve as an entry point for executable code 305 to runtime execution environment 200. Loader 315 may be disposed in an unmanaged execution environment (ie., OS), although at least one example of runtime execution environment 200 may include loader 315 therein.

Administrator 215 may configure memory management module 210 in runtime execution environment 200 based on type data that is provided within header 310 or is otherwise associated with executable code 305. However, alternative implementations of administrator 215 may configure memory management module 210 in runtime execution environment based on various other specifications and/or parameters provided within header 310. Regardless, administrator 215 may serve as a repository for the data, specifications, and/or parameters related to execution of code within runtime execution environment 200. Thus, administrator 215 may configure memory management module 210 for the execution of executable code 305 in runtime execution environment 200 based on type data or other specifications or parameters associated with executable code 305.

For example, if the type data indicates that executable code 305 is associated with an interactive or GUI-based application, administrator 215 may implement concurrent GC functionality for memory management module 210 within runtime execution environment 200. Conversely, if the type data indicates that executable code 305 is associated with, e.g., a service application or non-interactive application, then administrator 215 may ensure that concurrent GC functionality is not implemented for memory management module 210 within runtime execution environment 200 during execution of executable code 305.

More particularly, memory management module 210 may refer to a work station garbage collector (i.e., WksGC). Typically, WksGC may have concurrent GC functionality implemented therein. Characteristics of concurrent GC functionality may include a short pause time, thus enabling garbage collection concurrent with execution of executable code 305 (i.e., enabling concurrent de-allocation and allocation). Thus, concurrent GC functionality may be suitable for implementation when e.g., the execution of executable code 305 is hosted is to be implemented within a threshold response time. However, as described above, concurrent GC functionality may not be desirable for service applications or non-interactive applications.

Therefore, based on, e.g. the type data or, alternatively other specifications or parameters contained within header 310, administrator 215 may control whether concurrent GC functionality of memory management module 210 is enabled or disabled in runtime execution environment 200. Specifically, concurrent GC functionality may be enabled if the type data or other specifications or parameters indicate that executable code 305 is associated with an interactive or GUI-based application; and concurrent GC functionality may be disabled if the type data or other specifications or parameters indicate that executable code 305 is associated with a service application or non-interactive application.

Administrator 215 may similarly enable or disable other memory management functionalities even if memory management module 210 refers to a server garbage collector (i.e., SvrGC), which may be suitable for implementation when e.g., two or more processors host runtime execution environment 200 in which execution of executable code 305 is hosted. Thus, based on the type data or other specifications or parameters associated with executable code 305, administrator 215 may enable or disable memory management functionalities when memory allocated for execution of executable code 305 is divided into heaps assigned to a particular processor and is further collected in parallel by plural processors.

Figure 4:
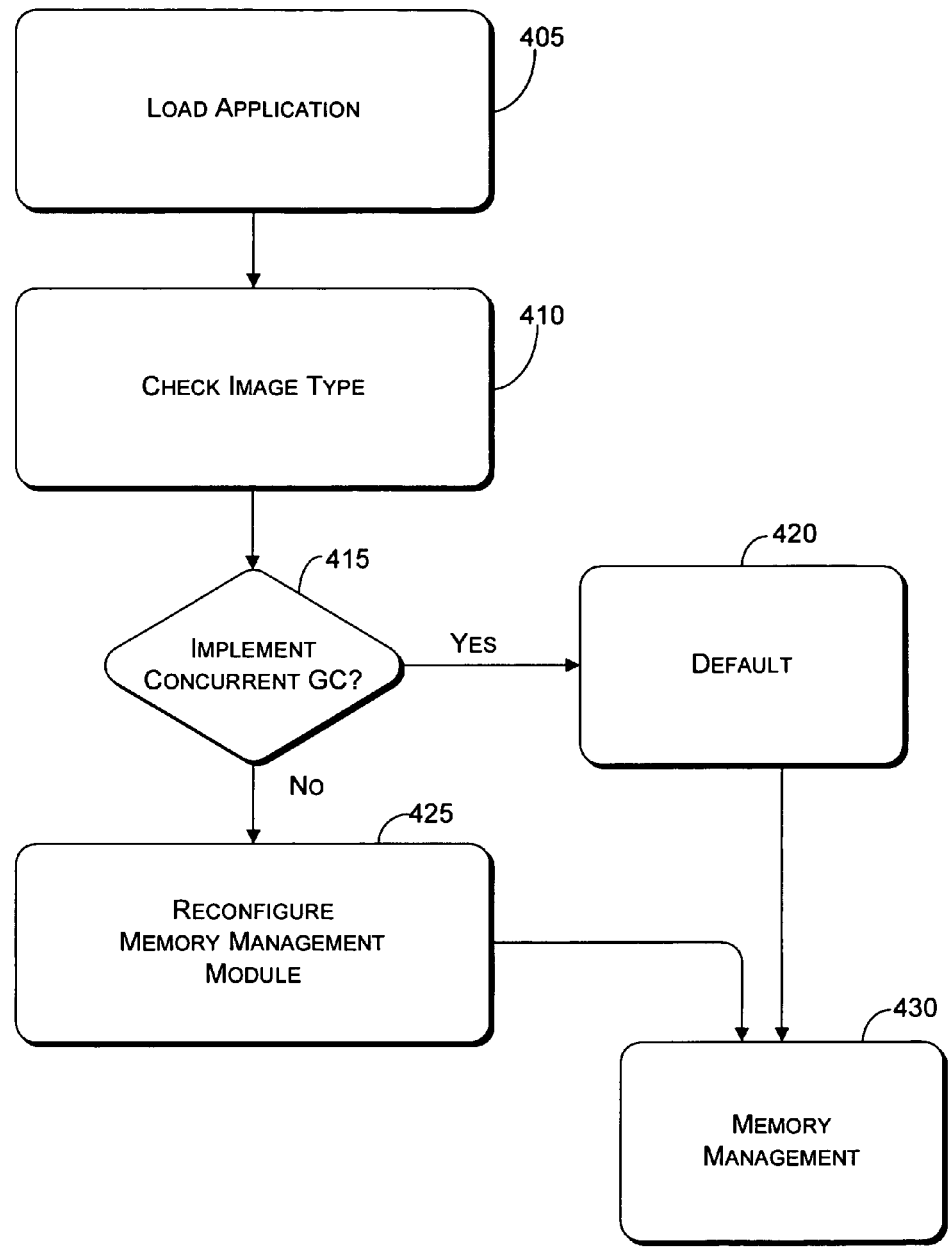
FIG. 4 shows an example processing flow in accordance with an example implementation of memory management configuration.

FIG. 4 shows example processing flow 400 corresponding to at least one example implementation of memory management configuration 120 (see FIG. 1). Example processing flow 400 is described below with references to features from FIGS. 1-3, although such implementations are provided only as examples and are not intended to be construed in any limiting manner.

Block 405 may refer to executable code 305 being loaded into runtime execution environment 200 by loader 315.

Block 410 may refer to administrator 215 checking the type data, or other specifications or parameters, associated with executable code 305 that is used to determine whether or not the type data indicates that executable code 305 is associated with an interactive or GUI-based application.

Decision 415 may refer to administrator 215 determining whether memory management module 210 is to implement concurrent GC functionality for the application, program, function, or other assemblage of programmable and executable code to which executable code 305 is associated.

Block 420 may refer to a default memory management configuration for memory management module 210 within runtime execution environment 200. More particularly, positive decision 415 may result in administrator 215 maintaining a default configuration for memory management module 210 in which concurrent GC functionality is implemented because the type data indicates that executable code 305 is associated with an interactive or GUI-based application.

Block 425, on the other hand, may refer to administrator 215 reconfiguring the memory management module 210 within runtime execution environment 200 for executable code 305 when the type data indicates that executable code 305 is associated with, e.g., a service application or non-interactive application. That is, according to the present example of processing flow 400, administrator 215 may turn off or otherwise disable concurrent GC functionality for memory management module 210 within runtime execution environment 200 during execution of executable code 305, which is determined to be a non-interactive or non-GUI-based application.

Block 430 may refer to memory management module 210, i.e., garbage collection, being implemented in accordance with the configuration deemed appropriate by administrator 215.

It is noted that processing flow 400, described above, refers to an example implementation. Alternative examples may include administrator 215 configuring memory management implementations within runtime execution environment 200 based on specifications or parameters other than type data. Examples of such specifications and/or parameters may include, but are not limited to scalability, performance, resource availability (e.g., memory, processors, running instances, and power), latency, and processing time. Further, the default configuration for memory management module 210 within runtime execution environment 200 is described above as enabling concurrent GC functionality as an example only. In no way is memory management module 210 limited to such configuration, and alternative examples of processing flow 400 may clearly refer to non-concurrent GC functionality as being the default configuration for memory management module 210 within runtime execution environment 200.

The description above, pertaining to FIGS. 1-4, memory management within a runtime execution environment may be configured in accordance with data associated with executable code loaded therein. However, the example limitations described herein are not limited to just configuration of memory management. Rather, further processing modules related to runtime execution environment 200 may be configured (i.e., without recompiling of executable code 305) upon loading executable code 305 within runtime execution environment 200 and without touching or otherwise affecting executable code 305, based upon the type data or others of the aforementioned specifications or parameters.

It is to be understood that the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

I claim:

1. A computer-readable medium having one or more executable instructions that, when read, cause one or more processors to:
    read header data corresponding to a managed image;
    determine whether the managed image is associated with a GUI-based application; and
    de-allocate objects corresponding to the managed image in accordance with a functionality implemented based on whether the managed image is determined to be associated with a GUI-based application.

2. A computer-readable medium according to claim 1, wherein, when the one or more instructions cause the one or more processors to determine that the managed image is associated with a GUI-based application, the one or more instructions that cause the one or more processors to de-allocate objects further cause the one or more processors to allow allocation of other objects to occur in parallel.

3. A computer-readable medium according to claim 1, wherein, when the one or more instructions cause the one or more processors to determine that the managed image is not associated with a GUI-based application, the one or more instructions that cause the one or more processors to de-allocate objects further cause the one or more processors to suspend allocation of other objects.

4. A computer-readable medium according to claim 1, wherein, when the one or more instructions cause the one or more processors to determine that the managed image is not associated with a GUI-based application, the one or more instructions that cause the one or more processors to de-allocate objects further cause the one or more processors to suspend one or more managed threads.

5. A computer-readable medium according to claim 1, wherein, when the one or more instructions cause the one or more processors to determine that the managed image is associated with a GUI-based application, the one or more instructions that cause the one or more processors to de-allocate objects further cause the one or more processors to implement concurrent garbage collector functionality.

6. A computer-readable medium according to claim 1, wherein, when the one or more instructions cause the one or more processors to determine that the managed image is not associated with a GUI-based application, the one or more instructions that cause the one or more processors to de-allocate objects further cause the one or more processors to implement non-concurrent garbage collector functionality.

7. A computer-readable medium according to claim 1, wherein the one or more instructions that cause the one or more processors to de-allocate objects further cause the one or more processors to enable concurrent garbage collector functionality in parallel with execution of a managed thread.

8. A computer-readable medium according to claim 1, wherein the one or more instructions that cause the one or more processors to de-allocate objects further cause the one or more processors to suspend a managed thread during garbage collection during non-concurrent garbage collector functionality.

9. A computer-implemented method, comprising:
reading header data corresponding to a managed image;
determining whether the managed image is associated with a GUI-based application; and
de-allocating objects corresponding to the managed image in accordance with a functionality implemented based on whether the managed image is determined to be associated with a GUI-based application.

10. A method according to claim 9, wherein de-allocating objects comprises allowing allocation of other objects to occur in parallel if it is determined that the managed image is associated with a GUI-based application.

11. A method according to claim 9, wherein de-allocating objects comprises suspending allocation of other objects if it is determined that the managed image is not associated with a GUI-based application.

12. A method according to claim 9, wherein de-allocating objects comprises suspending managed threads if it is determined that the managed image is not associated with a GUI-based application.

13. A method according to claim 9, wherein de-allocating objects comprises allowing managed threads if it is determined that the managed image is associated with a GUI-based application.

14. A method according to claim 9, further comprising enabling concurrent garbage collector functionality in parallel with execution of a managed thread.

* * * * *